(12) United States Patent
Kaneda et al.

(10) Patent No.: US 8,655,191 B2
(45) Date of Patent: Feb. 18, 2014

(54) SYMBOL TIMING RECOVERY IN POLARIZATION DIVISION MULTIPLEXED COHERENT OPTICAL TRANSMISSION SYSTEM

(75) Inventors: Noriaki Kaneda, Westfield, NJ (US); Andreas B. Leven, Heroldsberg (DE); Stefan Weisser, Nuremberg (DE)

(73) Assignee: Alcatel Lucent, Paris (FR)

( * ) Notice: Subject to any disclaimer, the term of this patent is extended or adjusted under 35 U.S.C. 154(b) by 519 days.

(21) Appl. No.: 12/493,337

(22) Filed: Jun. 29, 2009

(65) Prior Publication Data

US 2010/0329677 A1 Dec. 30, 2010

(51) Int. Cl.
*H04B 10/00* (2013.01)

(52) U.S. Cl.
USPC .......................... 398/205; 398/208; 398/155

(58) Field of Classification Search
USPC .................... 398/140, 152, 155, 202–206
See application file for complete search history.

(56) References Cited

U.S. PATENT DOCUMENTS

| | | | |
|---|---|---|---|
| 4,310,813 A | 1/1982 | Yuuki et al. | |
| 6,782,211 B1* | 8/2004 | Core ............................ | 398/205 |
| 7,209,670 B2 | 4/2007 | Fludger et al. | |
| 7,266,306 B1* | 9/2007 | Harley et al. ................. | 398/182 |
| 7,382,985 B2* | 6/2008 | Roberts et al. ................ | 398/159 |
| 7,397,865 B2 | 7/2008 | Moore et al. | |
| 7,529,481 B1* | 5/2009 | Doerr et al. ..................... | 398/16 |
| 7,532,822 B2* | 5/2009 | Sun et al. ...................... | 398/155 |
| 7,580,630 B2* | 8/2009 | Kee et al. ....................... | 398/25 |
| 7,627,252 B2* | 12/2009 | Sun et al. ...................... | 398/155 |
| 7,636,525 B1* | 12/2009 | Bontu et al. .................. | 398/208 |
| 7,701,842 B2* | 4/2010 | Roberts et al. ................ | 370/210 |
| 7,756,421 B2* | 7/2010 | Roberts et al. ................ | 398/158 |
| 8,023,402 B2* | 9/2011 | Roberts et al. ................ | 370/210 |
| 2005/0019042 A1 | 1/2005 | Kaneda et al. | |
| 2006/0285854 A1* | 12/2006 | Sun et al. ....................... | 398/155 |
| 2006/0285855 A1* | 12/2006 | Sun et al. ....................... | 398/155 |
| 2007/0036555 A1 | 2/2007 | Chen et al. | |
| 2007/0189371 A1 | 8/2007 | Yen | |
| 2008/0152361 A1 | 6/2008 | Chen et al. | |
| 2008/0152362 A1 | 6/2008 | Koc | |
| 2008/0152363 A1 | 6/2008 | Koc | |
| 2010/0329677 A1* | 12/2010 | Kaneda et al. .................. | 398/65 |

OTHER PUBLICATIONS

S. K. Barton, et al., "A Symbol Timing Recovery Scheme Based on Spectral Redundancy," IEEE Colloquium on Advanced Modulation and Coding Techniques for Satellite Communications, vol. 27, Jan. 1992, pp. 3/1-3/6.
F. M. Gardner, Interpolation in Digital Modems—Part I: Fundamentals, IEEE Transactions on Communications, vol. 41, Issue 3, Mar. 1993, pp. 501-507.
L. Erup et al., "Interpolation in Digital Modems—Part II: Implementation and Performance," IEEE Transactions on Communications, vol. 41, Issue 6, Jun. 1993, pp. 998-1008.
A.C. Ludwig, "The Definition of Cross Polarization," IEEE Transactions on Antennas and Popagation, Jan. 1973, pp. 116-119.
X. Lu et al., "Digital Self-Coherent Detection," Optics Express, vol. 16, Jan. 2008, pp. 792-803.
Y. Han et al., "Coherent Optical Communication Using Polarization Multiple-Input-Multiple-Output," Optics Express, vol. 13, Issue 19, Sep. 2005, pp. 7527-7534.

* cited by examiner

*Primary Examiner* — Agustin Bello
(74) *Attorney, Agent, or Firm* — Wall & Tong, LLP (57) ABSTRACT

A method, apparatus and system for providing clock and data recovery in a receiver for receiving a high speed coherent polarization division multiplexed optical signal using a digital signal processing block including a spectral domain spatial combiner are provided.

34 Claims, 7 Drawing Sheets

SYMBOL TIMING RECOVERY IN POLARIZATION DIVISION MULTIPLEXED COHERENT OPTICAL TRANSMISSION SYSTEM

FIELD OF THE INVENTION

The invention relates to optical receivers and, more particularly, to clock recovery within a polarization division multiplexed (PDM) coherent optical receiver.

BACKGROUND

Clock and data recovery (CDR) in digital signal processing (DSP) based optical receivers is challenging if the received signal is distorted by chromatic dispersion, polarization mode dispersion or non-linear effects. Traditional digital clock recovery schemes are too complex to be implemented at data rates typically used in optical communications.

Clock and data recovery in digital signal processing (DSP) based optical receivers can be performed either in analog domain, digital domain, or in a mixed-mode fashion.

In an analog clock and data recovery scheme, the unprocessed signal before digitization is used for extracting a clock signal. This imposes limits on the maximum signal distortion (chromatic dispersion, polarization-mode dispersion, non-linearity) a receiver can handle independently of post-compensation.

In a digital clock and data recovery scheme, the digitized signal is processed by (1) extracting the actual clock signal, and (2) re-processing the sampled data so that it reflects the timing estimate extracted in the clock recovery scheme. Some clock signal extraction techniques in the digital domain are based on Fast Fourier Transform (FFT)-based tone extraction, while data recovery is typically performed using an interpolation filter with adjustable coefficients or a using a bank of interpolation filters with fixed coefficients. The adjustment of the coefficients in the first case or the selection of the output filter in the second case is based on the phase of the recovered clock.

In a mixed-mode clock and data recovery scheme, a control signal is fed back to an oscillator that creates a clock signal for an analog-to digital conversion based on the digitally recovered clock.

The non-data aided (NDA) symbol timing recovery method known today as Gardner timing error detector and other methods described in *Digital Communication Receivers*, H. Meyr, Jon Wiley & Sons, incorporated herein by reference in its entirety, that are developed for DSL and wireless communications, can be useful for non-PDM systems or PDM systems with slowly varying polarization, but they are inadequate to cope with PDM systems in general, especially with rapidly changing polarization and polarization mode dispersion of the optical transport system. Also, conventional methods suffer from chromatic dispersion. Prior approaches may also be limited by jitter tolerance and polarization tracking speed due to the feedback loop used in the method.

BRIEF SUMMARY

Embodiments of the present invention provide new and improved methods, apparatuses and systems that address the above-referenced difficulties and others.

One embodiment provides a method for recovering the clock timing of a polarization division multiplexed (PDM) signal having two linear polarization states, each having an in-phase and quadrature-phase component. Complex signals X and Y representing sampled in-phase and quadrature-phase components for each orthogonal linear polarization state of the PDM signal are processed by a Fourier transform operation to form respective frequency domain signals TX and TY. The frequency domain signals TX and TY are then separated into upper and lower sideband components. The upper sideband components of TX and TY are multiplied by complex conjugates of the lower sideband components of TX and TY to obtain co-polarization and cross-polarization terms for each orthogonal linear polarization state. Thereafter, the phase of the determinant of a two-by-two matrix having each of the co-polarization terms and cross-polarization terms for each orthogonal linear polarization state as matrix elements is computed and the clock timing of the PDM signal is recovered in accordance with the phase of the determinant.

Another embodiment provides a receiver for receiving a polarization division multiplexed (PDM) signal having two orthogonal linear polarization states, each having an in-phase and quadrature-phase component, adapted to recover the clock timing of the PDM signal. The receiver includes at least one analog to digital converter for sampling the PDM signal to obtain complex signals X and Y representing sampled in-phase and quadrature phase components for each orthogonal linear polarization state of the PDM signal. The receiver also includes a digital signal processor adapted to: process complex signals X and Y by a Fourier transform operation to form frequency domain signals TX and TY, separate each of the frequency domain signals TX and TY into upper and lower sideband components, multiply the upper sideband components of TX and TY by complex conjugates of the lower sideband components of TX and TY to obtain co-polarization and cross-polarization terms for each orthogonal linear polarization state, compute the phase of the determinant of a two-by-two matrix having each of the co-polarization and cross-polarization terms for each orthogonal linear polarization state as matrix elements, and recover the clock timing of the PDM signal in accordance with the phase of the determinant.

Further scope of the applicability of the various embodiments will become apparent from the detailed description provided below. It should be understood, however, that the detailed description and specific examples, while indicating particular embodiments of the invention, are given by way of illustration only, since various changes and modifications within the spirit and scope of the invention will become apparent to those skilled in the art.

BRIEF DESCRIPTION OF THE DRAWINGS

The teachings that follow can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Embodiments will be primarily described within the context of a DSP processing block for a coherent optical receiver comprising one or more optical hybrids. However, those skilled in the art and informed by the teachings herein will realize that such embodiments are also applicable to any DSP-enhanced receiver implementing any known method or components for receiving a coherent signal.

Symbol timing recovery in PDM (polarization division multiplexing) optical coherent system needs to satisfy a few critical requirements. The first requirement is that symbol phase detection (timing error detection) needs fast polarization tracking capability or polarization transparency characteristics due to the rapid and arbitrary change in the state of polarization in fiber transmission system. The second is that phase detection and correction (interpolator) needs a very short or no feedback scheme due to the fast jitter and rapid change in optical polarization. The third requirement is the ability to do non-data aided (NDA) symbol timing recovery as opposed to data-aided (DA) symbol timing recovery that can be naturally achieved with an optical frequency division multiplexing (OFDM) system for example.

The above requirements, and various deficiencies of the prior art, are addressed by embodiments of the present apparatus, system and method for processing a sequence of complex values associated with a modulated optical carrier. According to various embodiments a spectral domain spatial combiner is used to achieve the timing error detection circuit which is transparent to polarization change and polarization mode dispersion. The spectral domain spatial combiner is based on the determinant of a matrix whose elements are the co- and cross-polarization correlation terms of time-averaged spectral domain input signals. According to one embodiment, feedforward interpolation is used to eliminate the loop bandwidth limitation associated with a feedback loop without resorting to four-times over-sampling required in previously reported feedforward techniques, such as square timing recovery reported in *Digital Communication Receivers*, H. Meyr, Jon Wiley & Sons, incorporated herein by reference.

Figure 1:
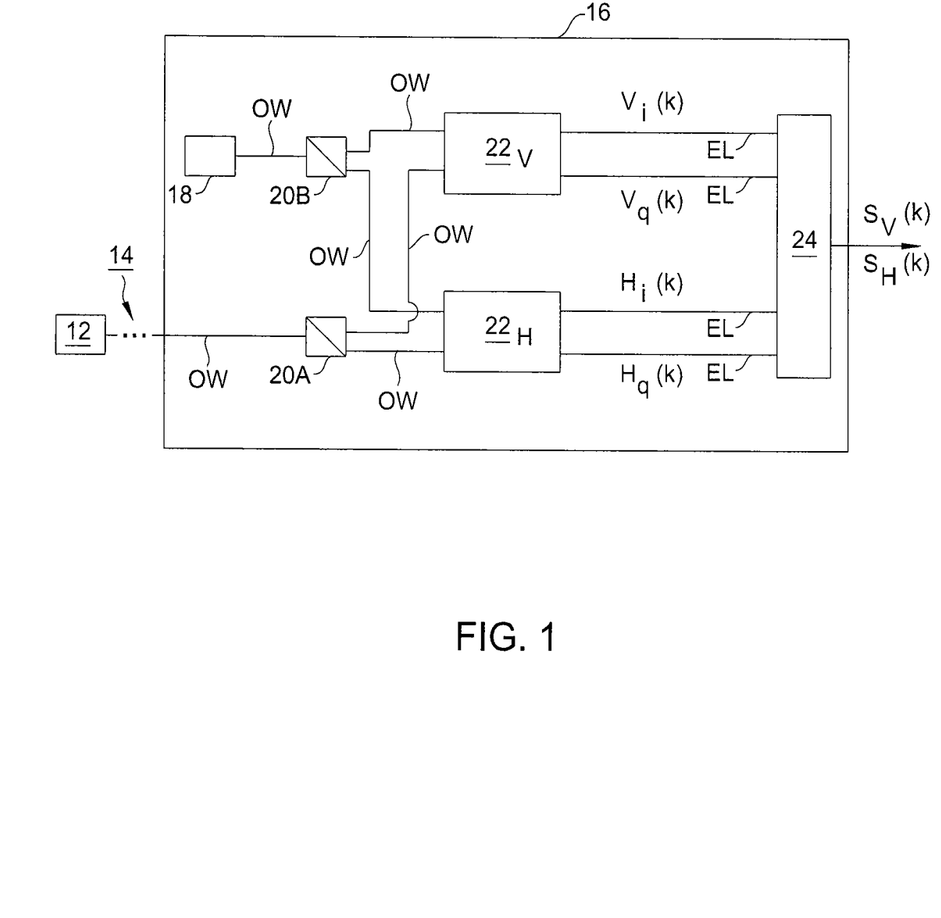
FIG. 1 depicts a high level block diagram of a polarization-sensitive optical receiver according to one embodiment.

FIG. 1 depicts a high level block diagram of a polarization-sensitive optical receiver 16 according to one embodiment. Specifically, the optical receiver 16 receives a modulated optical carrier from an optical transmitter 12 via an optical communications channel 14, illustratively a fiber or free-space optical channel. The modulation format is for example phase shift keying (PSK) or quadrature amplitude modulation (QAM). The optical receiver 16 in some embodiments receives and demodulates data from an optical carrier that has polarization multiplexed data thereon, and in some embodiments may receive and demodulate data from an optical carrier in a polarization diverse manner.

The optical receiver 16 includes a local optical oscillator 18, polarization splitters 20, 2×2 hybrid optical detectors $22_V$, $22_H$, a digital signal processor (DSP) 24, and a plurality of optical waveguides (OWs) and electrical lines (ELs) that connect elements 18, 20, $22_V$, $22_H$, 24, and optical and electrical ports of the optical receiver 16. Herein, the letters and subscripts "V" and "H" will be used to indicate two orthogonal linear polarization components, e.g., the "vertical" and "horizontal" components in a laboratory frame.

The local optical oscillator 18 produces a continuous-wave (CW) reference optical carrier at or about the wavelength of the modulated optical carrier received from the optical communications channel 14. The local optical oscillator 18 comprises, illustratively, a stabilized diode laser. For example, the laser may include a conventional wavelength locker that keeps its frequency within a preselected maximum offset from the frequency of the modulated optical carrier transmitted by the optical transmitter 12. A first optical splitter 20A passes portions of the modulated optical carrier to each of the hybrid optical detectors $22_V$, $22_H$. A second optical splitter 20B passes portions of the optical signal produced by the local optical oscillator 18 to each of the hybrid optical detectors $22_V$, $22_H$. The local optical oscillator 18 frequency down-mixes the received optical carrier in the hybrid optical detectors $22_V$, $22_H$. Thus, the local optical oscillator 18 is configured to produce the reference optical carrier with a frequency $\omega_{RC}$ that is approximately equal to the frequency $\omega_{MC}$ of the data-carrying modulated optical carrier, which is transmitted by the optical transmitter 12. The optical receiver 16 does not, however, have a feedback loop for phase or frequency locking the local optical oscillator 18 to the modulated optical carrier.

The hybrid optical detectors $22_V$, $22_H$ receive and coherently mix the modulated optical carrier from the optical communications channel 14 with the CW reference optical carrier from the local optical oscillator 18. By such mixing, each hybrid optical detector $22_V$, $22_H$ produces a first electrical stream of complex digital sampled values $V_{(k)s}$, and a second electrical stream of complex digital sampled values $H_{(k)s}$. Here, $V_{(k)}=[V_{i(k)}+jV_{q(k)}]$ and $H_{(k)}=[H_{i(k)}+jH_{q(k)}]$. The $V_{(k)s}$ and $H_{(k)s}$ are complex digital sampled values indicative in amplitude and phase of the respective "V" and "H" linear polarization components of the modulated optical carriers as frequency down-mixed by the reference optical carrier. In one embodiment, the sampling rate is 2 times the symbol rate of the received optical carrier 14. One of skill in the art will appreciate that other sampling rates are possible in accordance with various embodiments, for example, 4 times the symbol rate or 8 times the symbol rate. In addition, although a polarization-sensitive optical receiver has been depicted and described in one embodiment as including two optical hybrids, other arrangements are possible in accordance with other embodiments. For example, in one embodiment a polarization-sensitive optical receiver may implement only a single optical hybrid, such as a six-port optical hybrid.

The DSP 24 constructs one or two output streams of estimated demodulated symbols, illustratively a stream $S_V(k)$ and a stream $S_H(k)$ from the corresponding one or two streams of complex digital sampled values that are received from the hybrid optical detectors $22_V$, $22_H$ (i.e., the streams $V_{(k)s}$ and $H_{(k)s}$). The DSP 24 may perform various types of digital processing on the complex digital sampled values received from the hybrid optical detectors $22_V$, $22_H$ to improve estimations of the demodulation of data there from. For example, the digital processing may correct or compensate for signal degradations produced by optical transmission and detection, such as due to a frequency offset, polarization transformation, polarization mode dispersion, chromatic dispersion, and noise. The DSP 24 may also perform polarization tracking/correction and clock recovery, as will be described in greater detail below, in particular with regard to FIGS. 4 and 5.

Figure 2:
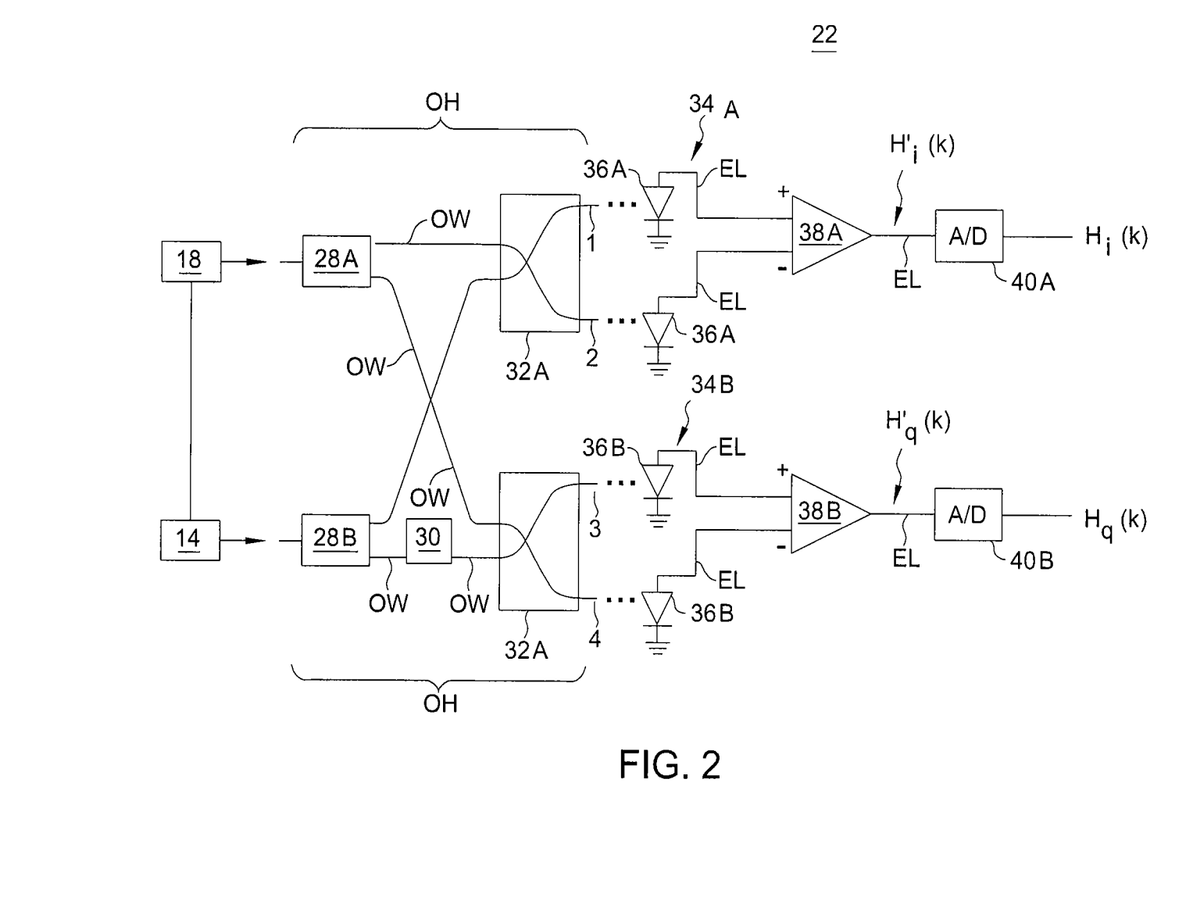
FIG. 2 depicts a high level block diagram of a hybrid optical detector suitable for use in a polarization-sensitive optical receiver, such as the polarization-sensitive optical receiver of FIG. 1, in accordance with one embodiment.

FIG. 2 depicts a high level block diagram of a hybrid optical detector 22 in accordance with one embodiment. Specifically, FIG. 2 shows a structure 22 which may be suitable for use as the hybrid optical detectors $22_V$, $22_H$ of the receiver 16 of FIG. 1. In the following discussion, optical hybrid 22 will be described with respect to the "H" or horizontal polarized component of input signal 14. It is to be understood that a second hybrid optical detector, operating in a substantially identical manner, processes the corresponding "V" or vertically polarized component of input signal 14.

The hybrid optical detector 22 includes an optical hybrid (OH) section and first and second optical detector sections that measure light intensities output by the optical hybrid via digital sampling. The optical hybrid section OH includes two 1×2 optical intensity splitters 28A, 28B, an optical phase delay 30, and two 2×2 optical couplers 32A, 32B as well as optical waveguides OW connected to various ones of these elements. The optical hybrid section produces, at two pairs of optical outputs (i.e., pair (1,2) and pair (3,4)), respective signals comprising interfered mixtures of the modulated and reference optical carriers. The relative intensities of the mixtures at the two outputs of each pair are sensitive to relative phases of the interfered light. The relative phases of the interfered mixtures at the first pair of optical outputs are different than at the second pair of optical outputs.

Each optical detector includes one pair 34A, 34B of photodiodes 36A, 36B, a differential amplifier 38A, 38B, and analog-to-digital converters 40A, 40B as well as electrical lines EL interconnecting various ones of these elements. Each optical detector measures the optical signals at one pair of the optical outputs of the optical hybrid OH section (i.e., the pair (1,2) or the pair (3,4)). Each optical detector produces a sequence of digital electrical values by sampling the intensities of the interfered carriers at one pair of the optical outputs of the optical hybrid. According to one embodiment, the received signals are oversampled at a rate greater than the bit rate, preferentially two-times the symbol rate. One of skill in the art will appreciate that other sampling rates are possible in accordance with various embodiments, for example, 4 times the symbol rate or 8 times the symbol rate.

Each 1×2 optical intensity splitter 28A, 28B power splits received light so that about 50 percent of the light is directed to each of its optical outputs. One of the 1×2 optical intensity splitters 28A is connected to receive light from the local optical oscillator 18. The other of the 1×2 optical intensity splitters 28B is connected to receive light of the modulated optical carrier from the optical communications line 14. Each of the 1×2 optical intensity splitters 28A, 28B is connected to deliver light to an optical input of the 2×2 optical coupler 32A and to an optical input of the other 2×2 optical coupler 32B.

The optical phase delay 30 and connected optical waveguides OW introduce a relative phase delay Δ between the light transmitted from the 1×2 optical splitter 28B to the 2×2 optical coupler 32B and the light transmitted from the 1×2 optical splitter 28B to the 2×2 optical coupler 32A. Typically, the relative phase delay Δ is between π/3 and 2π/3 modulo 2π. The relative phase delay Δ is preferably between 3π/8 and 5π/8 modulo 2π and is more preferably about π/2 modulo 2π. By contrast, the other optical waveguides OW do not introduce a substantial relative phase delay (e.g., modulo Pπ) between the light transmitted from the other optical intensity splitter 28A to the optical coupler 32A and the light transmitted from the other optical intensity splitter 28A to the optical coupler 32B.

Alternately, the optical phase delay 30 may be connected to one of the optical outputs of the 1×2 optical splitter 28A rather than to one of the optical outputs of the 1×2 optical splitter 28B (not shown). Then, the optical phase delay 30 would introduce a relative phase delay Δ between the light transmitted from the 1×2 optical splitter 28A to the 2×2 optical coupler 32A and the light transmitted from the 1×2 optical splitter 28A to the 2×2 optical coupler 32B. The relative phase delay Δ is between approximately π/3 and 2π/3 modulo 2π. In one embodiment the relative phase delay Δ is between approximately 3 π/8 and 5 π/8 modulo 2π. In this embodiment, the optical waveguides, OW, between the other optical intensity splitter 28B introduce substantially zero relative phase delay. That is, modulo 2π between the light transmitted from the 1×2 optical splitter 28B to the 2×2 optical coupler 32A and the light transmitted from the 1×2 optical splitter 28B to the 2×2 optical coupler 32B.

In the hybrid optical detector 22, each of the 2×2 optical couplers 32A, 32B is connected to receive the same linear polarization component from the modulated optical carrier and the reference optical carrier. The optical couplers 32A, 32B mix (i.e., interfere) the light received at their optical inputs to produce preselected combinations of said light at their optical outputs. The optical couplers 32A, 32B may be implemented using, illustratively, conventional couplers or multi-mode interference (MMI) devices.

At each optical output of the 2×2 optical couplers 32A, 32B, a photo-diode 36A, 36B is positioned to detect the intensity of the output light. The photo-diodes form two matched pairs 34A, 34B, i.e., with a similar light-sensitivity and bandwidth. Each matched pair 34A, 34B of photo-diodes 36A, 36B transmits to the inputs of one of the differential amplifier 38A, 38B signals whose values are indicative of the detected output light intensities. Optionally, there might be an additional electrical amplifier in-between each photo-diode 36A, 36B and the inputs of the differential amplifier 38A. In an alternate embodiment, single ended photo detectors are used.

Each differential amplifier 38A, 38B outputs an analog voltage, i.e., $H'_i(k)$, $H'_q(k)$, proportional to the signal difference between its two inputs. From the analog voltages, the first and second A/D converters 40A, 40B produce respective first and second temporal sequences of digital sampled values (i.e., $H_i(k)$, $H_i(k+1)$, ... and $H_q(k)$, $H_q(k+1)$ ... ). To produce these sequences, the A/D converters 40A, 40B sample the analog voltages (i.e. $H'_i(k)$ and $H'_q(k)$) at sampling rate equal to or higher than of the modulation/symbol rate of the signal input from 14. In one embodiment, the A/D converters sample at approximately twice the symbol rate. One of skill in the art will appreciate that other sampling rates are possible in accordance with various embodiments, for example, 4 times the symbol rate or 8 times the symbol rate.

The A/D converters 40A, 40B transmit the digital sampled values (i.e., $H_i(k)$ and $H_q(k)$) to the DSP 24 at sampling period "k". Here, the complex sampled value H(k) satisfies: $H(k) = H_i(k) + jH_q(k)$. Each complex digital sampled value output by one of the hybrid optical detectors 22 can be modeled as having the form:

$$X(k) = [B_X(k) + N_X(k)] \exp[i\phi_X(k)]. \quad \text{(eq. 1)}$$

In the above equation, $B_X(k)$ and $\phi_X(k)$ are the amplitude and phase, and $N_X(k)$ is an amplitude noise at the sampling period "k". "X" denotes either of the V or H orthogonal linear polarization components of the input signal. The phase $\phi(k)$ may be represented as $\phi_B(k)+\phi_S(k)+kT_S(\omega_{MC}-\omega_{RC})$ where $T_S$ is the sampling period, $\phi_B(k)$ is a phase angle for a PSK symbol, and $\phi_S(k)$ is an aggregate phase angle noise. The phase angles for PSK symbols have the form $2N\pi/M$ where N is a positive integer and less than M. The positive integer M defines the PSK symbol constellation and may be 2, 3, 4, 5, . . . . For example, M=4 corresponds to the QPSK constellation, and M=8 corresponds to the 8 PSK symbol constellation. The aggregate phase angle noise $\phi_S(k)$ may receive contributions from the line widths of the optical transmitter 12 and the local optical oscillator 18, as well as from optical amplifier noise.

Figure 3:
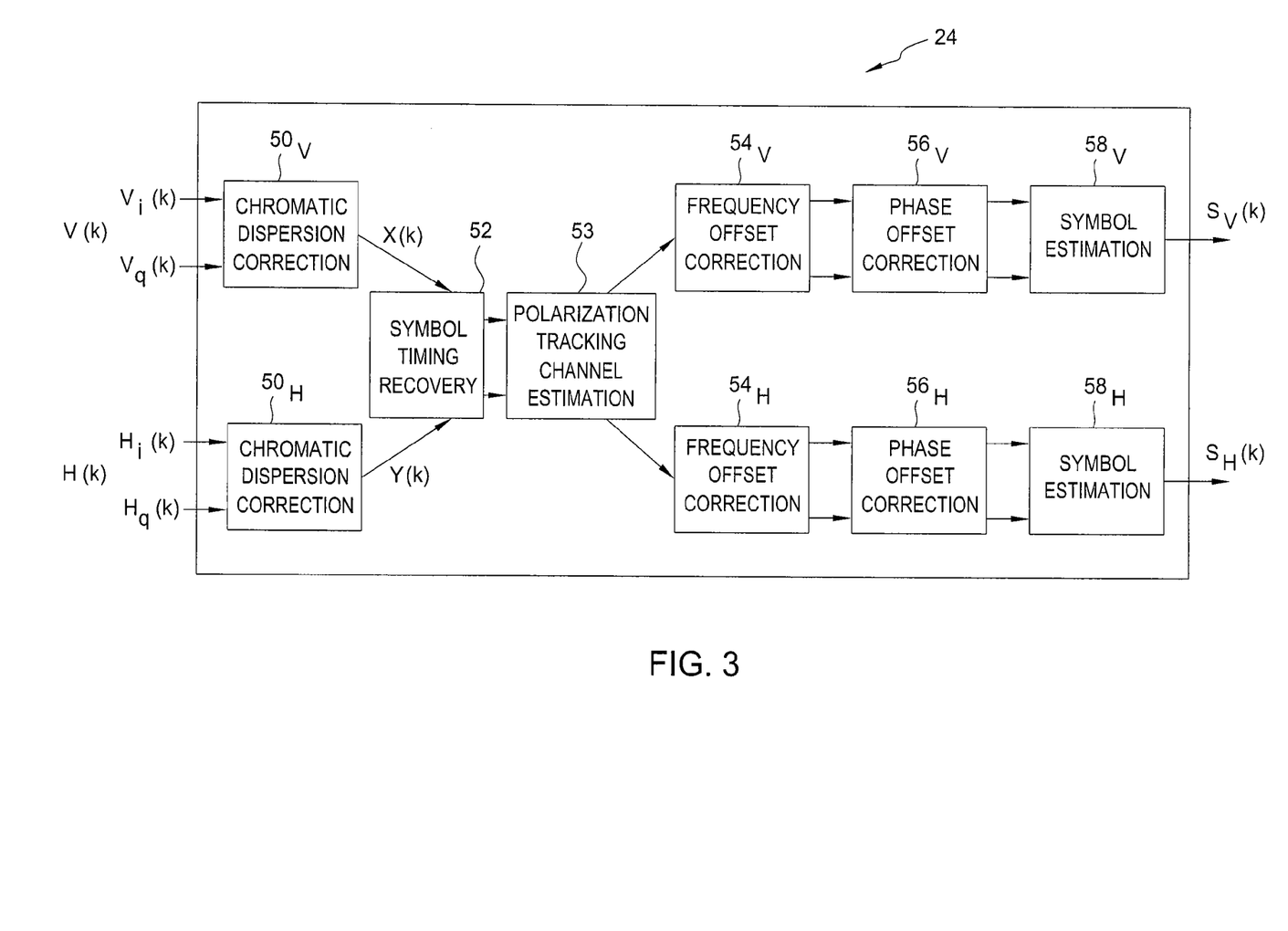
FIG. 3 depicts a high level block diagram of an exemplary digital signal processor (DSP) suitable for use in a polarization-sensitive optical receiver, such as the polarization-sensitive optical receiver of FIG. 1, in accordance with one embodiment.

FIG. 3 depicts a high level block diagram of an exemplary digital signal processor (DSP) 24 suitable for use in a polarization-sensitive optical receiver, such as the polarization-sensitive optical receiver 16 of FIG. 1, in accordance with one embodiment. The DSP 24 includes a series of structures that perform digital processing on the received H(k) and V(k) sequences to enable improved estimates of the values of the transmitted PSK symbol sequence. In the DSP 24, these structures may include one or more phase offset correctors $56_V$, $56_H$ and one or more symbol estimators $58_V$, $58_H$. Some embodiments of DSP 24 may also include chromatic dispersion correctors $50_V$, $50_H$; a polarization tracker/channel estimator 53; and/or frequency offset correctors $56_V$, $56_H$.

Below, exemplary digital processing structures are described for an embodiment of the DSP 24 as shown in FIG. 3.

Each chromatic dispersion corrector $50_V$ and $50_H$ processes the sequence of complex digital sampled values V(k) or H(k) received from the hybrid optical detectors $22_V$ and $22_H$ to produce a corrected sequence of X(k) or Y(k) (i.e., $X(k)=X_i(k)+jX_q(k)$). In the chromatic dispersion correctors $50_V$ and $50_H$, according to one embodiment the processing involves passing the received sequence of complex digital sampled values through a digital finite-impulse-response (FIR) filter. The FIR filter has weight coefficients selected to correct remaining inter-symbol interference caused by chromatic dispersion or other degrading effects in the optical communications channel 14. The weight coefficients may be static or may be adaptively updatable, e.g., via feedback to a weight update unit. In one embodiment, the chromatic dispersion correctors $50_V$ and $50_H$ may provide general channel correction such as, for example, correcting I/Q skew.

FIG. 3 also depicts symbol timing recovery circuit 52, which will be discussed and explained in further detail below; in particular, with regard to FIGS. 4 and 5.

The polarization tracker/channel estimator 53 performs digital processing configured to correct and/or compensate polarization-dependent degradations of the modulated optical carrier that are caused in the optical communications channel, such as optical communication channel 14 in FIG. 1. Thus, polarization tracker/channel estimator 53 is configured to provide channel estimation and/or channel equalization. The polarization-dependent degradations or distortions may include, i.e. polarization rotations, polarization transformation, and combinations of both. The polarization tracker/channel estimator 53 may include one constant modulus algorithm (CMA) adaptive FIR filter as opposed to three CMA adaptive FIR filters as described in co-pending application Ser. No. 12/182,221, filed Aug. 7, 2008, assigned to Lucent Technologies, Inc. and incorporated herein by reference.

The frequency offset correctors $54_V$ and $54_H$ perform processing that corrects or compensates for a relative phase error of the input complex digital signals, such as the signals output by the hybrid optical detectors $22_V$ and $22_H$ of FIG. 1, wherein relative phase error is due to a frequency offset. In particular, the relative phase error to be corrected or compensated is due to the frequency offset between the local optical oscillator 18 and the modulated optical carrier received from the optical communications channel 14 of FIG. 1.

The phase offset correctors $56_V$ and $56_H$ perform digital processing that corrects or compensates for phase errors caused by not fully compensated frequency offset between local oscillator and received signal, phase noise of the local oscillator and/or transmit laser as well as noise accumulated during transmission e.g. from optical amplifiers.

Each symbol estimator $58_V$ and $58_H$ performs one or more digital comparisons to estimate the symbol value S(k) that corresponds to each final corrected argument values. In particular, the symbol estimators $58_V$ and $58_H$ perform one or more digital comparisons for each received final corrected argument values to obtain an estimate of the symbols sequences $S_V(k)$ and $S_H(k)$, such as in manner functionally similar to a slicer.

Figure 4:
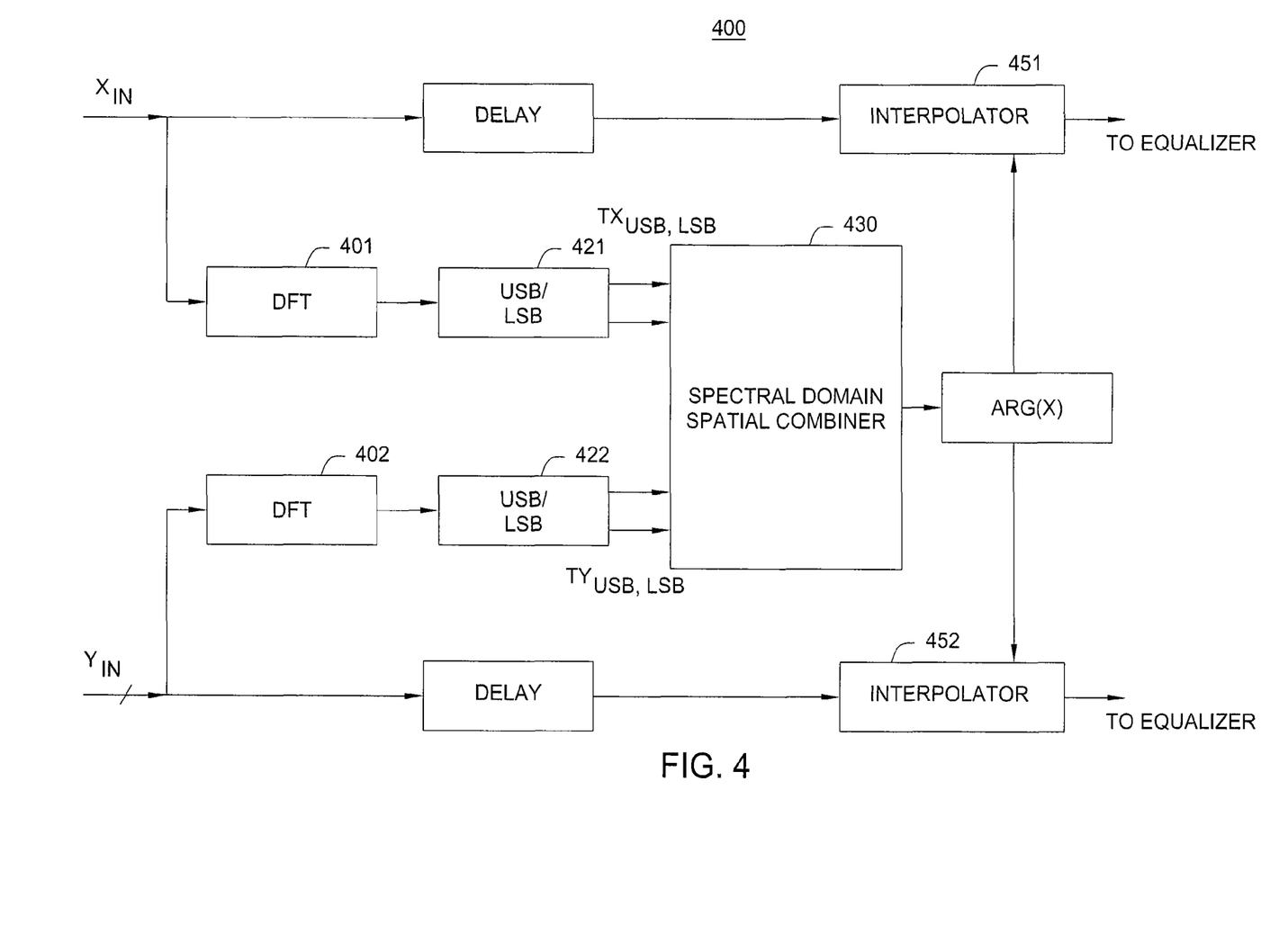
FIG. 4 depicts a high level block diagram of an exemplary spectral domain spatial combiner suitable for use in a polarization-sensitive optical receiver, such as the polarization-sensitive optical receiver of FIG. 1, in accordance with one embodiment.

An exemplary symbol timing recovery circuit 400 (also referred to herein as a clock recover circuit) is shown in FIG. 4, in accordance with one embodiment. In one embodiment, the signals are sampled at sampling rate such that the Nyquist bandwidth is higher than the signal bandwidth. There are two sampled complex signals (Xin, Yin) which may arrive from IQ detectors $22_V$ and $22_H$ of FIG. 1, corresponding to the two input polarization states. Additionally, Xin and Yin may correspond to X(k) and Y(k) shown in the exemplary DSP 24 of FIG. 3. The oversampled time-domain input signals are converted to frequency-domain signals by DFT blocks 401 and 402 which are of given length. According to one embodiment the DFT blocks are of length 16. In another embodiment the DFT blocks are of length 32. One skilled in the art will appreciate that other block lengths are possible in accordance with the present invention. The converted frequency domain signals are then separated into the upper side band and lower side band frequency domain signals ($TX_{USB}$ $TX_{LSB}$, $TY_{USB}$ $TY_{LSB}$). For example, the frequency domain signals may be separated into upper side band and lower sideband components by the techniques described in "A Symbol Timing Recovery Scheme Based on Spectral Redundancy," by S. K. Barton and Y. O. Jalili published on Jan. 27, 1992 in Advanced Modulation and Coding Techniques for Satellite Communications, IEEE, pages 3/1-3/6, which Applicants incorporate by reference herein in its entirety. In one embodiment, upper sideband components and lower sideband components separated by the symbol rate are computed.

The upper side band (USB) and lower side band (LSB) frequency domain signals are next combined for co- and cross-polarization correlation in the spectral domain spatial combiner 430. The spectral domain spatial combiner 430 outputs the argument (x) of a determinant of a matrix, wherein the argument (x) represents the timing error that is the timing phase offset between N times symbol rate and the sampling rate, where the sampling rate is approximately N times the symbol rate. In one embodiment, the sampling rate is 2 times the symbol rate. One of skill in the art will appreciate that other sampling rates are possible in accordance with various embodiments, for example, 4 times the symbol rate or 8 times the symbol rate. Also depicted in FIG. 4 are interpolators 451 and 452 which receive the argument (x) and the delayed signals Xin and Yin as inputs. The operation of spectral domain spatial combiner 430 and interpolators 451 and 452 are described in greater detail below, in particular with regard to FIG. 5.

Figure 5:
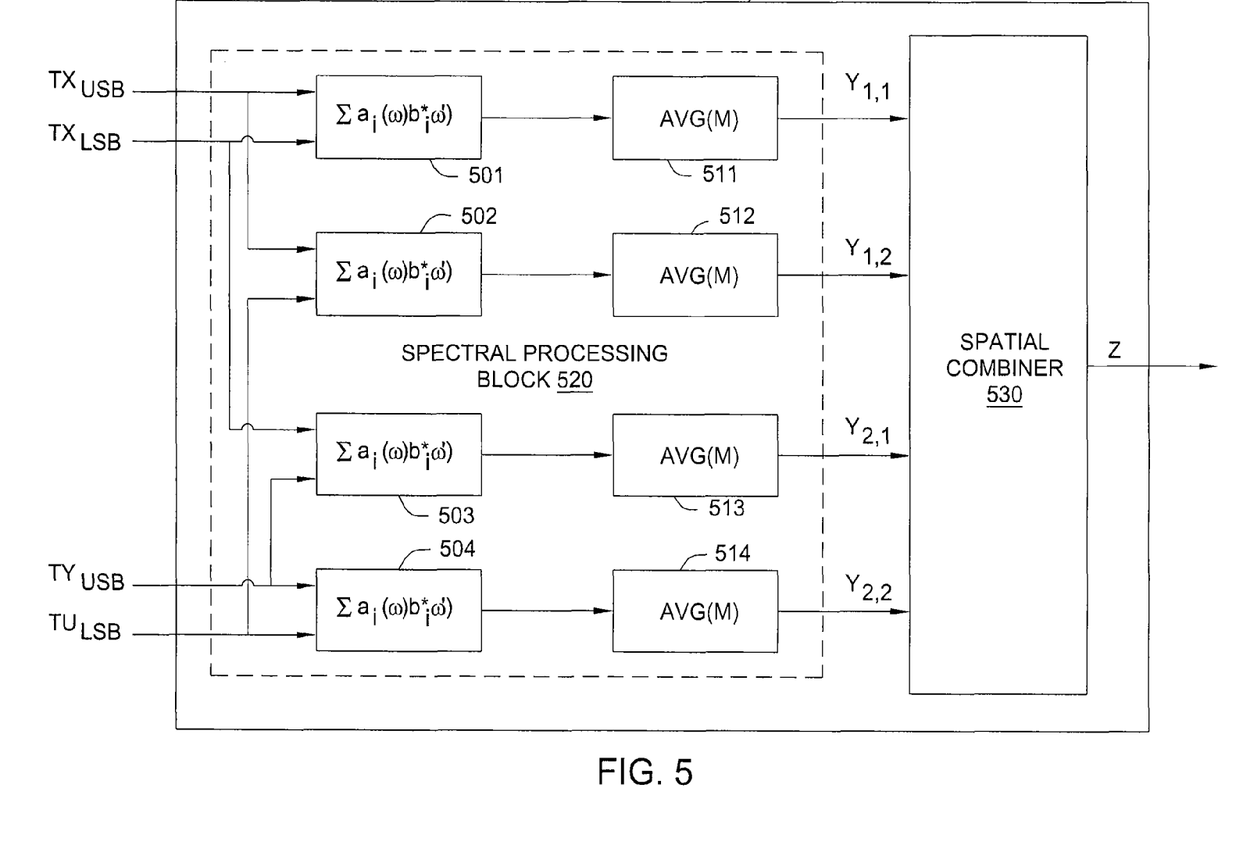
FIG. 5 depicts a detailed view of a spectral domain spatial combiner such as the spectral domain spatial combiner of FIG. 4, in accordance with one embodiment.

FIG. 5 depicts a detailed view of a spectral domain spatial combiner (SDSC), such as SDSC 430 of FIG. 4, in accordance with one embodiment. The SDSC 430 accepts as inputs the USB and LSB signals of the two polarization states $TX_{USB}$, $TX_{LSB}$, $TY_{USB}$ and $TY_{LSB}$. The frequency domain signals $TX_{USB}$, $TX_{LSB}$, $TY_{USB}$ and $TY_{LSB}$ are combined for co- and cross-polarization as shown in blocks 501-504. Specifically, the upper sideband signals $TX_{USB}$ and $TY_{USB}$ are each multiplied by the complex conjugates of $TX_{LSB}$ and $TY_{LSB}$ to obtain co-polarization and cross-polarization terms for each of the two orthogonal polarizations. For example, in block 501 the upper sideband represented as "a" and the lower sideband of X represented as "b" are multiplied wherein b* denotes the complex conjugate of "b".

According to one embodiment, $\Sigma_i$ represents the summation over several frequencies present in the signals $TX_{USB}$, $TX_{LSB}$, $TY_{USB}$ and $TY_{LSB}$. In one embodiment, less than all frequencies present in a signal are used in the summation calculation procession. For example, ⅛ or ¼ of the frequencies present in the signal may be used in the summation calculation processing. In one embodiment, preferably the reference frequencies are selected at or near the lower or middle portion of the spectrum of the received signal.

In blocks 511-514 the summed signals of blocks 501-504 are stored and time averaged over a time period M. According to one embodiment, the time averaging is performed over 16 sample periods. The time averaging may also be performed over other sample periods as necessary, for example 32 sample periods. The results are taken to obtain terms $Y_{1,1}$, $Y_{1,2}$, $Y_{2,1}$, $Y_{2,2}$ that are input to spatial combiner 530. The terms $Y_{1,1}$, $Y_{1,2}$, $Y_{2,1}$, $Y_{2,2}$ form the components of a matrix that is manipulated in spatial combiner 530. Specifically, a matrix Y may be arranged as:

$$Y = \begin{pmatrix} Y1,1 & Y1,2 \\ Y2,1 & Y2,2 \end{pmatrix}.$$

Once the components of matrix Y are obtained, the determinant (Z=detY) of the matrix Y is computed. The phase of the complex value Z is the timing error that is the timing phase offset between N times symbol rate and the sampling rate, where the sampling rate is approximately N times the symbol rate.

The timing error arg(x) which represents the phase of the complex value Z is fed to the interpolators (FIG. 4, 451-452) to correct the offset between the sampling rate and N times the symbol rate. Some interpolators based on transition error feedback as well as feedforward techniques are explained in *Digital Communication Receivers*, H. Meyr, Jon Wiley & Sons, incorporated herein by reference in its entirety. The outputs of the interpolators may be further processed by equalizers (not shown) that are well known to one of skill in the art. In addition, as may be appreciated by one of skill in the art, although depicted herein with respect to a feedforward implementation, the current method of timing error detection can be applied to both feedforward and feedback timing recovery approaches.

The effectiveness of the current method is proven in a simulation model that can be implemented in FPGA and ASIC device. The timing error detector is capable of detecting sample jitters and clock offset in a very stringent optical transmission environment and the interpolator accomplishes proper symbol timing recovery. The results of an example simulation conducted by the inventors shows that the symbol timing is successfully recovered and the bit error rate penalty is negligible with heavily noise loaded signals. In the experimental setup, the conditions are: signal bit rate-116 Gbps, OSNR-15.5 dB, 300 ps/nm residual dispersion, one half UI Differential Group Delay (DGD), 100 kHz polarization rotation, and 2 MHz 1.5 UI peak-peak jitter with 200 ppm clock offset.

Figure 6:
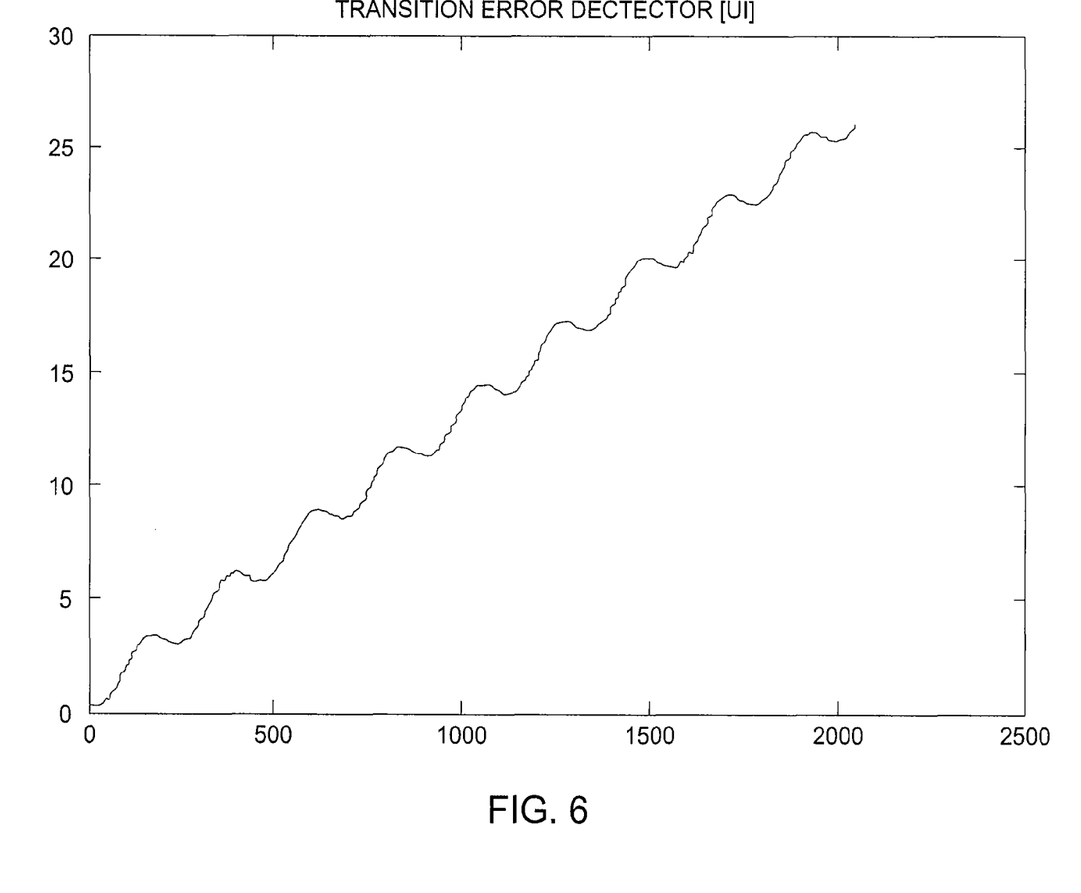
FIG. 6 depicts a graph of experimental simulation results for the output of the timing error detector according to an exemplary embodiment.

FIG. 6 depicts the output results of a timing error detector operating with the experimental parameters. It indicates that the 2 MHz jitter and fixed timing offset of 200 ppm is successfully detected by the proposed method despite severe conditions of the received signals. Thus, the method achieves more reliable and more robust symbol timing recovery in a PDM optical system than any other similar systems known to the inventors can achieve.

Figure 7:
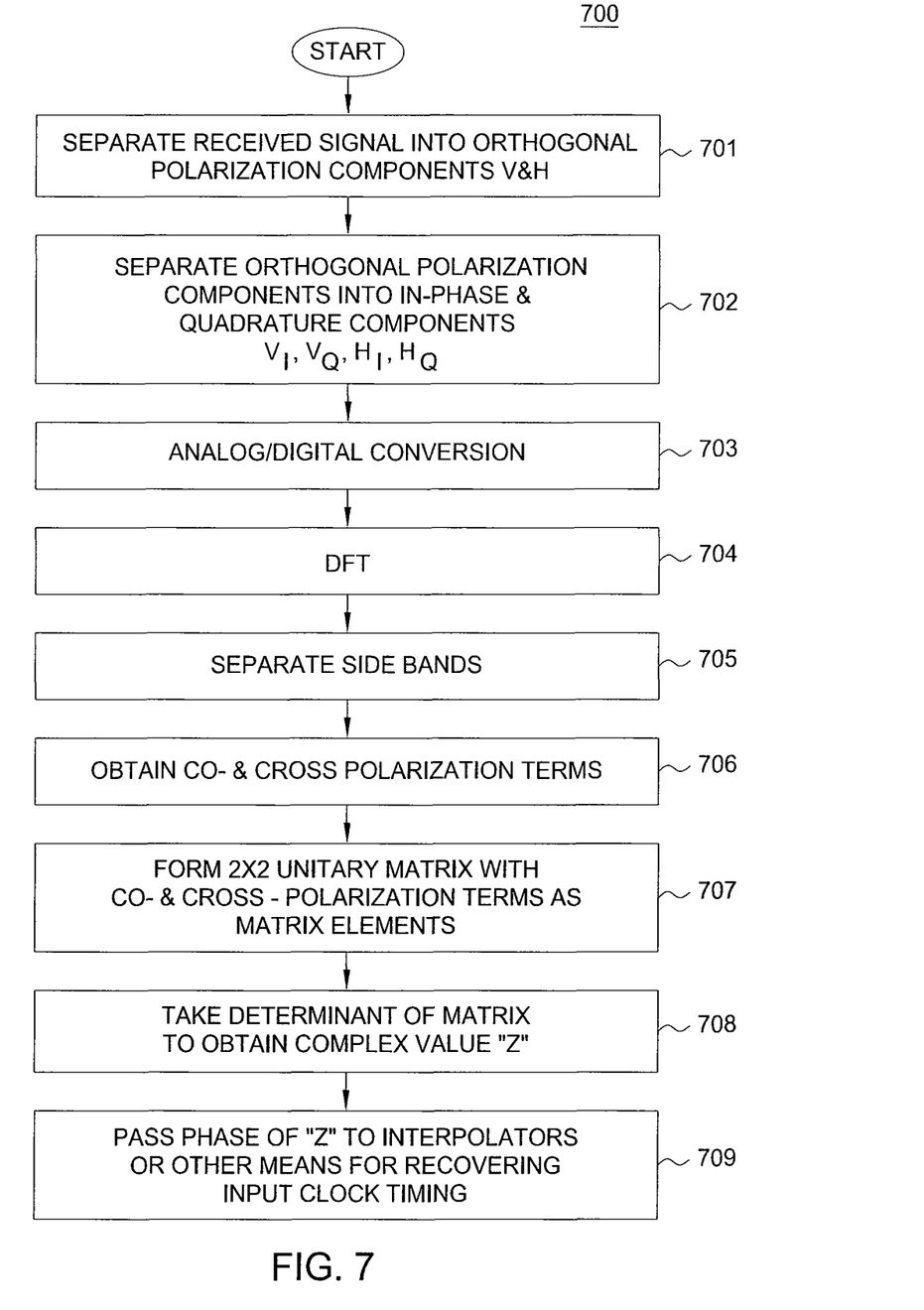
FIG. 7 depicts a flow diagram of a method for obtaining the clock timing of a received PDM coherent optical signal according to one embodiment.

FIG. 7 shows an exemplary method according to one embodiment of the present invention. At step 701 an input PDM coherent optical signal is received and separated into orthogonal polarization components V and H, preferably by means of one or more beam splitters; for example, beam splitters 20A and 20B of FIG. 1. At step 702, V and H are further separated into in-phase and quadrature components $V_I$, $V_Q$, $H_I$, and $H_Q$. Step 702 may be performed, for example, by one or more optical hybrids, such as optical hybrids $22_V$ and $22_H$ of FIG. 1. At step 703, the component optical signals $V_I$, $V_Q$, $H_I$, and $H_Q$ are converted to electrical signals by conversion means; for example, by electro-optic detectors such as high speed photodiodes, a balanced detector or other similar means. The converted analog electrical signals are digitized; for example, by analog to digital converters such as A/D converters 40A and 40B in FIG. 1. Preferably, the analog signals are oversampled. In one embodiment, the A/D conversion of step 703 occurs at approximately twice the symbol rate. However, one of skill in the art will appreciate that other sampling rates are possible in accordance with various embodiments, for example, 4 times the symbol rate or 8 times the symbol rate. Complex digital signals V and H are output from step 703, where $V=[V_I+jV_Q]$ and $H=[H_I+jH_Q]$, and passed to the next step.

At step 704 the discrete Fourier transforms (DFT) of the digitally sampled signals V and H are taken to obtain signals TX and TY. In one embodiment, step 704 may occur within DSP processing block 24 of FIGS. 1 and 3. In particular, step 704 may occur within symbol timing recovery block 52 of the DSP 24, as shown in FIG. 3, and/or in DFT blocks 401 and 402 of the symbol timing recovery circuit 400 depicted in FIG. 4.

At step 705, the DFT converted signals are separated into their respective upper sideband and lower sideband components $TX_{USB}$, $TX_{LSB}$, $TY_{USB}$, and $TY_{LSB}$. In one embodiment, step 705 may occur within DSP processing block 24 of FIGS. 1 and 3. In particular, step 705 may occur within symbol timing recovery block 52 of the DSP 24, as shown in FIG. 3, and/or in blocks 421 and 422 of the symbol timing recovery circuit 400 depicted in FIG. 4.

At step 706 the upper sidebands $TX_{USB}$ and $TY_{USB}$ are multiplied by complex conjugates of the lower sideband components $TX_{LSB}$ and $TY_{LSB}$ to obtain co-polarization and cross-polarization terms for each of the two orthogonal polarizations. In one embodiment, step 706 may occur within DSP processing block 24 of FIGS. 1 and 3. Similarly, step 706 may occur within symbol timing recovery block 52 of the DSP 24, as shown in FIG. 3, and/or in the spectral domain spatial combiner 430 of the symbol timing recovery circuit 400 depicted in FIGS. 4 and 5.

At step 707 the two co-polarization and two cross-polarization terms are used to form a 2×2 unitary matrix Y. Specifically, in one embodiment matrix Y may be arranged as:

$$Y = \begin{pmatrix} Y1,1 & Y1,2 \\ Y2,1 & Y2,2 \end{pmatrix}.$$

Step 707 may similarly occur within DSP processing block 24 of FIGS. 1 and 3. Additionally, step 706 may occur within symbol timing recovery block 52 of the DSP 24, as shown in FIG. 3, and/or in the spectral domain spatial combiner 430 of the symbol timing recovery circuit 400 depicted in FIGS. 4 and 5.

At step 708 the determinant of Y is taken to obtain complex value Z. The phase of Z is the clock symbol timing offset between the local clock and the input clock.

At step 709 the phase term of complex value Z calculated in step 708 is used for further processing to obtain the clock timing and perform data recovery. For example, one or more interpolators, such as interpolators 451 and 452 of FIG. 4, may provide additional processing in order to obtain clock timing and perform data recovery with respect to the input signal.

An apparatus according to one embodiment for use in an optical receiver comprises a digital signal processor (DSP) including a spectral domain spatial combiner, as described herein (e.g., DSP 24 in FIGS. 1 and 3, and SDSC 430 in FIGS. 4 and 5), implemented in a general purpose computer or a special purpose computer. In various embodiments, such a DSP includes or cooperates with one or more processors, various support circuitry, input-output (I/O) circuitry, memory, communication buses and so on for receiving, processing, providing and/or exchanging information.

The at least one processor may be any conventional processor for executing programs stored in memory. The memory may be any conventional volatile memory (e.g., RAM, DRAM, among others), non-volatile memory (e.g., disk drives, floppy, drives, CDROM, EPROMS, among other computer readable medium) or any other conventional memory device for storing data and various control programs, such as methodology according to the present invention.

The processor cooperates with conventional support circuitry, such as power supplies, clock circuits, cache memory and the like, as well as circuits that assist in executing the various programs and routines, as well as other programs and data. As such, it is contemplated that some of the process steps discussed herein as software processes may be implemented within hardware, for example, as circuitry that cooperates with the processor to perform various steps. The input/output (I/O) circuitry forms an interface between the various functional elements communicating with each network element.

Although a DSP described herein is depicted as a general-purpose computer that is programmed to perform various control functions in accordance with the present embodiments, various embodiments may be implemented in hardware such as, for example, an application specific integrated circuit (ASIC) or a field-programmable gate array (FPGA). As such, it is intended that the processes described herein be broadly interpreted as being equivalently performed by software, hardware, or a combination thereof.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method in a receiver for recovering clock timing of a polarization division multiplexed (PDM) signal having two linear polarization states, each having an in-phase and quadrature-phase component, wherein complex signals X and Y represent sampled in-phase and quadrature-phase components for each orthogonal linear polarization state of the PDM signal, comprising the steps of:
    processing each of the complex signals X and Y using at least one or more reference frequencies associated with a spectrum of the sampled PDM signal to obtain co-polarization and cross-polarization terms for each orthogonal linear polarization state of the one or more reference frequencies; and
    determining a phase of a determinant of a two-by-two matrix, from said terms, the two-by-two matrix having the co-polarization and cross-polarization terms as elements therein, said phase value being indicative of clock timing offset of the PDM signal.

2. The method of claim 1, further comprising:
    providing the phase of the determinant to one or more units adapted to recover the clock timing of the PDM signal using the phase of the determinant.

3. The method of claim 2, wherein the one or more units adapted to recover the clock timing of the PDM signal are interpolators.

4. The method of claim 2, wherein the phase of the determinant is provided to the one or more units in a feedforward manner or as feedback.

5. The method of claim 1, wherein the PDM signal is a wavelength division multiplexed (WDM) signal.

6. The method of claim 1, wherein said sampling comprises oversampling at a sampling rate greater than a symbol rate of the PDM signal.

7. The method of claim 6, wherein the sampling rate is two times the symbol rate of the PDM signal.

8. The method of claim 1, wherein the steps of the method are performed automatically by said receiver.

9. The method of claim 8, wherein said receiver comprises a digital signal processor adapted to perform the steps of the method.

10. The method of claim 1, wherein said PDM signal is an optical signal.

11. The method of claim 1, wherein the steps of the method are performed by a unit, the unit being disposed between one or more chromic dispersion correctors and one or more equalizers.

12. The method of claim 1, wherein processing each of the complex signals X and Y to obtain the co-polarization and cross-polarization terms for each orthogonal linear polarization state comprises:
    processing each of the complex signals X and Y by a Fourier transform operation to form respective frequency domain signals TX and TY;
    separating each of the frequency domain signals TX and TY into upper and lower sideband components; and
    multiplying the upper sideband components of TX and TY by complex conjugates of the lower sideband components of TX and TY to obtain thereby the co-polarization and cross-polarization terms for each orthogonal linear polarization state.

13. The method of claim 12, wherein said multiplying further comprises:
averaging the obtained co-polarization and cross-polarization terms over multiple frequencies.

14. The method of claim 12, wherein said multiplying further comprises:
time-averaging the obtained co-polarization and cross-polarization terms over multiple sample periods.

15. The method of claim 12, wherein said separating comprises computing upper sideband components and lower sideband components separated by the symbol rate.

16. An apparatus for recovering the clock timing of a polarization division multiplexed (PDM) signal having two orthogonal linear polarization states, each having an in-phase and quadrature-phase component, wherein complex signals X and Y represent sampled in-phase and quadrature-phase components for each orthogonal linear polarization state of the PDM signal, comprising:
means for processing each of the complex signals X and Y using at least one or more reference frequencies associated with a spectrum of the sampled PDM signal to obtain co-polarization and cross-polarization terms for each orthogonal linear polarization state of the one or more reference frequencies; and
means for determining a phase of a determinant of a two-by-two matrix, from said terms, the two-by-two matrix having the co-polarization and cross-polarization terms as elements therein, said phase value being indicative of clock timing offset of the PDM signal.

17. The apparatus of claim 16, wherein the PDM signal is a wavelength division multiplexed (WDM) signal.

18. The apparatus of claim 16, wherein said PDM signal is an optical signal.

19. The apparatus of claim 16, wherein said means for processing each of the complex signals X and Y to obtain the co-polarization and cross-polarization terms for each orthogonal linear polarization state comprises:
means for processing each of the complex signals X and Y by a Fourier transform operation to form respective frequency domain signals TX and TY;
means for separating each of the frequency domain signals TX and TY into upper and lower sideband components; and
means for multiplying the upper sideband components of TX and TY by complex conjugates of the lower sideband components of TX and TY to obtain thereby the co-polarization and cross-polarization terms for each orthogonal linear polarization state.

20. The apparatus of claim 19, wherein said multiplying means further comprises:
means for averaging the obtained co-polarization and cross-polarization terms over multiple frequencies.

21. The apparatus of claim 19, wherein said multiplying means further comprises:
means for time-averaging the obtained co-polarization and cross-polarization terms over multiple sample periods.

22. The apparatus of claim 19, wherein said separating means further comprises:
means for computing upper sideband components and lower sideband components separated by the symbol rate.

23. The apparatus of claim 16, further comprising:
means for providing the phase of the determinant to one or more units adapted to recover the clock timing of the PDM signal using the phase of the determinant.

24. The apparatus of claim 23, wherein the means for providing the phase of the determinant to the one or more units comprises:
mean for providing the phase of the determinant to the one or more units in a feedforward manner or as feedback.

25. The apparatus of claim 23, wherein the one or more units adapted to recover the clock timing of the PDM signal are interpolators.

26. The apparatus of claim 16, wherein the means for determining the phase of the determinant is configured to be disposed between one or more chromic dispersion correctors and one or more equalizers.

27. A receiver for receiving a polarization division multiplexed (PDM) signal having two orthogonal linear polarization states, each having an in-phase and quadrature-phase component, adapted to recover the clock timing of the PDM signal, comprising:
at least one analog to digital converter for sampling the PDM signal to obtain thereby complex signals X and Y representing sampled in-phase and quadrature phase components for each orthogonal linear polarization state of the PDM signal; and
a digital signal processor adapted to:
process each of the complex signals X and Y using at least one or more reference frequencies associated with a spectrum of the sampled PDM signal to obtain co-polarization and cross-polarization terms for each orthogonal linear polarization state of the one or more reference frequencies; and
determine a phase of a determinant of a two-by-two matrix, from said terms, the two-by-two matrix having the co-polarization and cross-polarization terms as elements therein, said phase value being indicative of clock timing offset of the PDM signal.

28. A system for coherent optical communication, comprising:
at least one transmitter for transmitting a polarization division multiplexed (PDM) signal having two orthogonal linear polarization states, each having an in-phase and quadrature-phase component; and
at least one receiver for receiving the PDM signal and adapted to recover the clock timing of the PDM signal, comprising:
at least one analog to digital converter for sampling the PDM signal to obtain thereby complex signals X and Y representing sampled in-phase and quadrature phase components for each orthogonal linear polarization state of the PDM signal; and
a digital signal processor adapted to:
process each of the complex signals X and Y using at least one or more reference frequencies associated with a spectrum of the sampled PDM signal to obtain co-polarization and cross-polarization terms for each orthogonal linear polarization state of the one or more reference frequencies; and
determine a phase of a determinant of a two-by-two matrix, from said terms, the two-by-two matrix having the co-polarization and cross-polarization terms as elements therein, said phase value being indicative of clock timing offset of the PDM signal.

29. An apparatus for recovering clock timing of a polarization division multiplexed (PDM) signal having two linear polarization states, each having an in-phase and quadrature-phase component, wherein complex signals X and Y represent sampled in-phase and quadrature-phase components for each orthogonal linear polarization state of the PDM signal, the apparatus comprising:
  a digital signal processor configured to:
    process each of the complex signals X and Y using at least one or more reference frequencies associated with a spectrum of the sampled PDM signal to obtain co-polarization and cross-polarization terms for each orthogonal linear polarization state of the one or more reference frequencies; and
    determine a phase of a determinant of a two-by-two matrix, from said terms, the two-by-two matrix having the co-polarization and cross-polarization terms as elements therein, said phase value being indicative of clock timing offset of the PDM signal.

30. The apparatus of claim 29, the digital signal processor configured to:
  provide the phase of the determinant to one or more units adapted to recover the clock timing of the PDM signal using the phase of the determinant.

31. The apparatus of claim 30, the digital signal processor configured to provide the phase of the determinant to the one or more units in a feedforward manner or as feedback.

32. The apparatus of claim 30, wherein the one or more units adapted to recover the clock timing of the PDM signal are interpolators.

33. The apparatus of claim 29, the apparatus comprising at least one chromatic dispersion corrector and at least one equalizer, the digital signal processor configured to determine the phase of the determinant after chromic dispersion correction by the at least one chromatic dispersion corrector and before equalization by the at least one equalizer.

34. The apparatus of claim 29, further comprising:
  at least one hybrid optical detector configured to produce the sampled versions of the respective in-phase and quadrature-phase components of the orthogonal linear polarization states.

* * * * *